Patented July 4, 1939

2,164,755

UNITED STATES PATENT OFFICE 2,164,755

GALVANIC BATTERY

Erich Marhenkel, Berlin, Germany, assignor to "Pertrix" Chemische Fabrik Aktiengesellschaft, Berlin, Germany, a joint-stock company of Germany No Drawing. Application August 10, 1936, Serial No. 95,286. In Germany August 15, 1935

6 Claims. (Cl. 136—103)

My invention relates to improvements in galvanic batteries, and more particularly in batteries of the type in which the electrolyte contains such ions as are liable to be transformed into hydroxides and to be deposited in this form on the positive electrode thus tending to clog the pores of the said positive electrode, and in which the positive electrode is depolarized by the oxygen of air contained therein. The said electrolyte contains for example sal ammoniac and zinc chloride. As is known in the art, such ions are either zinc or manganese ions, which are developed either from a negative zinc electrode in an electrolyte of any composition, or from an electrolyte containing zinc or manganese and having a negative electrode of any composition immersed therein. In positive electrodes in which depolarization is effected by chemical depolarizers such as manganese oxide the amount of solid sal ammoniac in the electrode must be small, in order to prevent reduction of the depolarization intensity or high destruction of the zinc. I have discovered, that in positive electrodes in which depolarization is effected by the oxygen of air the amount of sal ammoniac may be comparatively high, and that a high amount of sal ammoniac in the said electrode with air depolarization produces valuable results which will be described hereinafter.

Further, I have found that similar results are attained when in lieu of sal ammoniac or in addition to sal ammoniac organic derivatives of ammoniac such for example as monomethylaminchlorohydrate are present in the said electrode, suitable organic derivatives being such which contain NH or $NH_2$ groups.

The positive electrode may consist, for example, of a porous body of active carbon having an excess of air. To the said electrode I add a comparatively high proportion of sal ammoniac or an organic derivative of ammoniac such as monomethylaminchlorohydrate, or both sal ammoniac and an organic derivative of ammonia, the amount of the said substance or substances being such that, with the intensity of the discharge current and the duration of the discharge occurring in service and caused by the regular concentration of the zinc or manganese ions, deposition of zinc or manganese salts, particularly in the form of the hydroxides, on or within the electrode is prevented. I have found that this result is attained if the amount of sal ammoniac or an organic derivative of ammonia in the electrode is such that there is always an excess of sal ammoniac or an organic derivative of ammonia over the zinc or manganese ion concentrations corresponding to the intensity of the discharge current and the duration of the discharge. Practically this is the case if the said amount is about 50 grammes per 100 cubic centimeters of the finished oxygen transmitting positive electrode (without its terminal). The said positive electrode is manufactured by thoroughly mixing fine crystalline sal ammoniac with the active carbon, adding thereto a slight amount of the electrolyte, shaping from the mixture the electrode, and combining the components by high pressure.

The amount of other derivatives of ammonia to be added to the electrode is substantially the same.

I have discovered that in an electrode with depolarization by air the depolarizing action is not impaired in any way even if the content of sal ammoniac is high, the reason being that in this case the depolarizer is the air contained within the electrode. A particularly important result is obtained by the high addition of sal ammoniac in so far as the precipitation of the salts of zinc or manganese on or within the electrode is reduced. In this respect use has been made of the fact that the precipitation of the said salts of ammonia, and more particularly of the hydroxide of the zinc or the manganese, is safely avoided where sal ammoniac is present in excess, the sal ammoniac contained within the electrode being dissolved, in accordance with the intensity of the current discharge and the duration of the discharge, by the water produced on or within the electrode, and the dissolved sal ammoniac safely preventing precipitation of the aforesaid salts. Thus any inactivation and more particularly any incrustation of the electrode on the surface thereof or within the same are prevented.

I claim:

1. The herein described galvanic battery, comprising a positive electrode of the type in which depolarization is effected by the oxygen of air contained within the electrode, a negative electrode, and an electrolyte containing such metal ions as are liable to be transformed into hydroxides and to be deposited on the positive electrode, in which the said positive electrode contains solid sal ammoniac in an amount such that, with the metal-ion concentration corresponding to the intensity of the discharge current and the duration of the discharge occurring in service, precipitation of metal salt on and within the positive electrode is prevented.

2. The herein described galvanic battery, comprising a positive electrode of the type in which depolarization is effected by the oxygen of air contained within the electrode, a negative electrode, and an electrolyte containing a zinc salt, in which the said positive electrode contains solid sal ammoniac in an amount such that, with the zinc-ion concentration corresponding to the intensity of the discharge current and the duration of the discharge occurring in service, precipitation of zinc salt on and within the positive electrode is prevented.

3. The herein described galvanic battery, comprising a positive electrode of the type in which depolarization is effected by the oxygen of air contained within the electrode, a negative electrode, and an electrolyte containing a manganese salt, in which the said positive electrode contains solid sal ammoniac in an amount such that, with the manganese-ion concentration corresponding to the intensity of the discharge current and the duration of the discharge occurring in service, precipitation of manganese salt on and within the positive electrode is prevented.

4. Galvanic battery as claimed in claim 1, in which the amount of sal ammoniac within the positive electrode is about 50 grammes per 100 cubic centimeters of the volume of the finished oxygen-transmitting positive electrode.

5. The herein described galvanic battery, comprising a positive electrode of the type in which depolarization is effected by the oxygen of air contained within the electrode, a negative electrode, and an electrolyte containing such metal ions as are liable to be transformed into hydroxides and to be deposited on the positive electrode, in which the said positive electrode contains solid monomethylaminchlorohydrate in an amount such that, with the metal-ion concentration corresponding to the intensity of the discharge current and the duration of the discharge occurring in service, precipitation of metal salt on and within the positive electrode is prevented.

6. The herein described galvanic battery, comprising a positive electrode of the type in which depolarization is effected by the oxygen of air contained within the electrode, a negative electrode, and an electrolyte containing such metal ions as are liable to be transformed into hydroxides and to be deposited on the positive electrode, in which the said positive electrode contains a solid salt of the group consisting of sal ammoniac and monomethylamin-chlorohydrate in an amount such that, with the metal-ion concentration corresponding to the intensity of the discharge current and the duration of the discharge occurring in service, precipitation of metal salt on and within the positive electrode is prevented.

ERICH MARHENKEL.